(12) United States Patent
Palchaudhuri et al.

(10) Patent No.: US 10,454,710 B2
(45) Date of Patent: *Oct. 22, 2019

(54) VIRTUAL LOCAL AREA NETWORK MISMATCH DETECTION IN NETWORKS

(71) Applicant: Hewlett Packard Enterprise Development LP, Houston, TX (US)

(72) Inventors: Santa Palchaudhuri, Bangalore Karnataka (IN); Sandeep Yelburgi, Bangalore Karnataka (IN); Herman Robers, Fairfax, VA (US); Sandip Devnath, Bangalore Karnataka (IN); Sandeep Unnimadhavan, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/832,265

(22) Filed: Dec. 5, 2017

(65) Prior Publication Data

US 2018/0097658 A1 Apr. 5, 2018

Related U.S. Application Data

(63) Continuation of application No. 14/266,594, filed on Apr. 30, 2014.

(51) Int. Cl.
*H04L 12/46* (2006.01)
*H04L 12/24* (2006.01)

(52) U.S. Cl.
CPC ...... *H04L 12/4641* (2013.01); *H04L 41/0873* (2013.01)

(58) Field of Classification Search
CPC .................. H04L 12/4641; H04L 41/0873
See application file for complete search history.

(56) References Cited

U.S. PATENT DOCUMENTS

2014/0233734 A1 8/2014 Ram et al.

*Primary Examiner* — Brandon M Renner
*Assistant Examiner* — Kevin H Lee
(74) *Attorney, Agent, or Firm* — Hewlett Packard Enterprise Patent Department

(57) ABSTRACT

The present disclosure discloses a method and network device for providing VLAN mismatch detection in networks. Specifically, a network device monitors a plurality of packets received by a first device from a second device to identify a first set of VLAN identifiers indicated by at least one of the plurality of packets. The network device receives from a third device at least one packet tagged with a particular VLAN identifier, whereas the at least one packet to be forwarded by the first device to the second device. The network device then determines whether the particular VLAN identifier is included in the first set of VLAN identifiers indicated by at least one of the plurality of packets received by the first device from the second device. If the particular VLAN identifier is not included in the first set of VLAN identifiers, the network device presents a notification.

20 Claims, 12 Drawing Sheets

VIRTUAL LOCAL AREA NETWORK MISMATCH DETECTION IN NETWORKS

FIELD

The present disclosure relates to virtual local area network (VLAN) management in networks. In particular, the present disclosure relates to a mechanism for virtual local area network mismatch detection in network.

BACKGROUND

Wireless digital networks, such as networks operating under the current Electrical and Electronics Engineers (IEEE) 802.11 standards, are spreading in their popularity and availability. However, networks work in synergy where different components usually work together to ensure a common goal. When the different components are managed via different systems, it can become cumbersome and error-prone to ensure that the configurations in different components are working together correctly.

Specifically, access points (APs) can be deployed in bridge mode in a WLAN. When operating in bridge mode, network packets are tagged by APs with VLAN tags and forwarded directly to the next hop network node without being transmitted to a centralized network controller device. Such deployment allows network packets to be bypassed by the centralized controller and transmitted to their destination via a shortest route. APs deployed in bridge mode is capable of providing firewall services, converting a wireless packet in accordance with IEEE 802.11 standard to a wired packet in accordance with IEEE 802.3, identifying a particular VLAN for the wired packet to be forwarded on, tagging the wired packet with a particular VLAN identifier, and forwarding the wired packet tagged with the particular VLAN identifier on the particular VLAN via a wired interface to an upstream switch device. In these scenarios, it is important for the upstream switch of an AP to be configured such that the uplink port of the switch connected to the AP allows the VLANs tagged by the AP.

Each AP has a configuration that provides a static mapping between a respective service set identifier (SSID) and a respective VLAN identifier. The configuration can be obtained from a management plane mechanism, for example, either received from user configuration or from a network control device. Alternatively, an AP can determine a VLAN identifier via a control plane mechanism, such as VLAN derivation based on a client device's authentication information obtained from communication between the AP and a network authentication server (e.g., a RADIUS server). This is often referred to as "per-user firewall."

If the upstream switch does not allow all of the VLANs that a wireless and/or wired client of the AP can possibly have, network traffic from the client would be denied of the service due to the VLAN configuration mismatch between the switch and the AP.

Moreover, in a centralized deployment where a cluster of network control devices manages all client devices in the WLAN, the upstream switch port of each network control device in the cluster must be correctly configured to allow the VLANs that client devices in the WLAN are assigned to. Because the network control devices and the switches in the WLAN may be from different vendor and configured through different systems, the VLAN configuration process possibly can generate mismatches between the VLANs configured for the upstream switch ports and the VLANs configured on the network control devices.

BRIEF DESCRIPTION OF THE DRAWINGS

The present disclosure may be best understood by referring to the following description and accompanying drawings that are used to illustrate embodiments of the present disclosure.

DETAILED DESCRIPTION

Figure 1A:
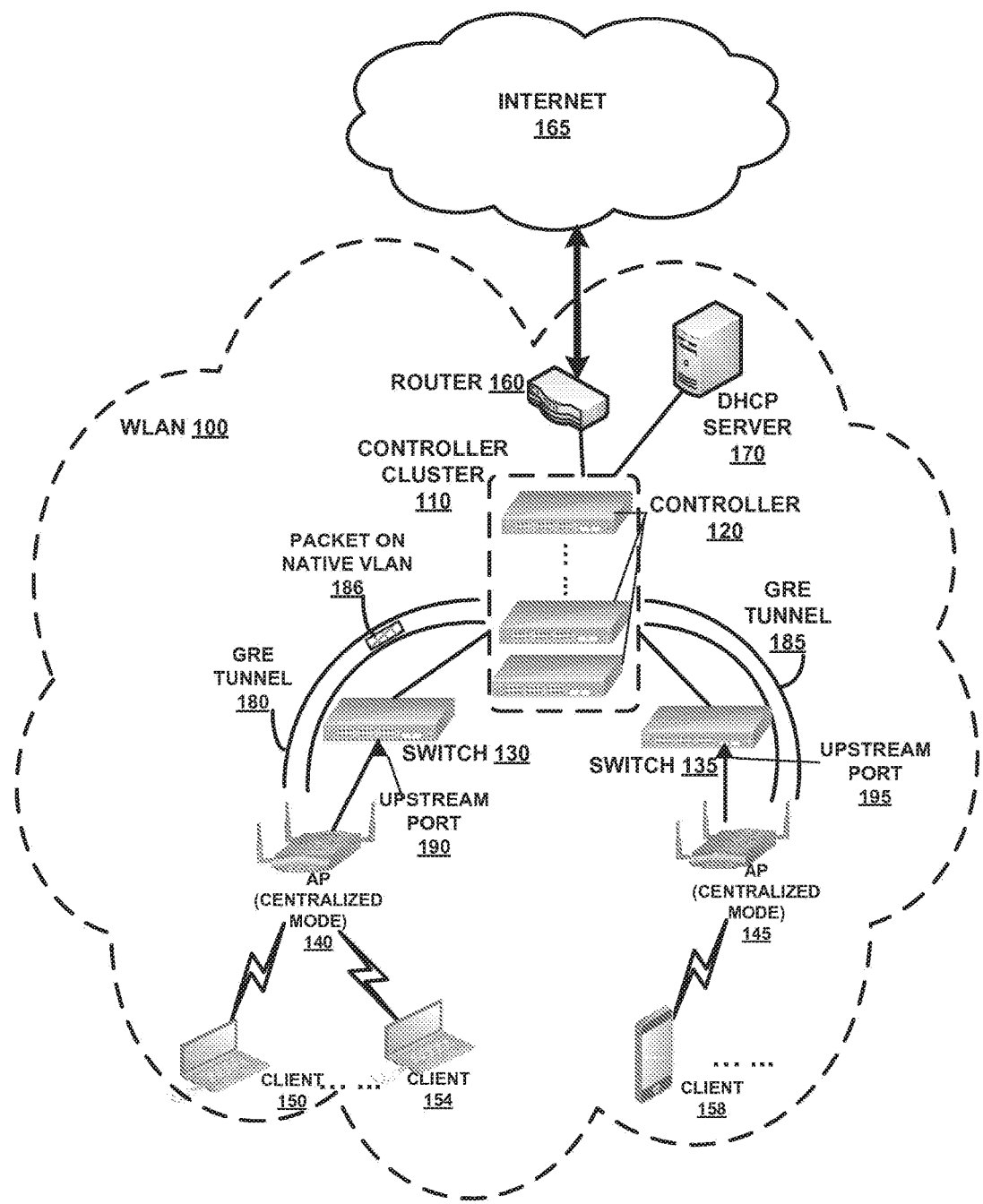
FIGS. 1A-1D show several exemplary computing environments according to embodiments of the present disclosure.

In the following description, several specific details are presented to provide a thorough understanding. While the context of the disclosure is directed to VLAN management in wireless network, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to virtual local area network (VLAN) management in networks. In particular, the present disclosure relates to a mechanism for virtual local area network mismatch detection in networks.

With the solution provided herein, the disclosed network device monitors a plurality of packets received by a first device from a second device to identify a first set of VLAN identifiers indicated by at least one of the plurality of packets. The network device receives from a third device at least one packet tagged with a particular VLAN identifier, whereas the at least one packet to be forwarded by the first device to the second device. The network device then determines whether the particular VLAN identifier is included in the first set of VLAN identifiers indicated by at least one of the plurality of packets received by the first device from the second device. Responsive at least to determining that the particular VLAN identifier is not included in the first set of VLAN identifiers, the network device presents a notification based on the determination.

According to some embodiments, a network device monitors a plurality of packets received by a first device from a second device to identify a first set of VLAN identifiers (a) indicated by at least one of the plurality of packets and (b) known to be recognized by the second device. The network device then compares (a) the first set of VLAN identifiers known to be recognized by the second device to (b) a second set of VLAN identifiers that are configured for the first device. Further, the network device identifies a particular VLAN identifier included in the second set of VLAN identifiers and not included in the first set of VLAN identifiers. Also, the network device transmits a first message to the second device, whereas the message is tagged with the particular VLAN identifier. Responsive to receiving a second message that is responsive to the first message, the network device updates the first set of VLAN identifiers known to be recognized by the second device to include the particular VLAN. Responsive to not receiving any message that is responsive to the first message, the network device presents a notification.

According to some embodiments, a network device identifies a plurality of VLANs identified by a plurality of VLAN identifiers configured for a first device. Moreover, responsive to identifying the plurality of VLANs, the network device transmits at least one packet on each of the plurality of VLANs regardless of whether data is received for forwarding by the first device on each of the plurality of VLANs.

Computing Environments

FIG. 1A shows an exemplary computing environment according to embodiments of the present disclosure. Specifically, as illustrated in FIG. 1A, a WLAN 100 includes a controller cluster 110, a router 160, a DHCP server 170, a number of access points (APs) deployed in centralized mode (such as, AP 140, AP 145, etc.), a number of client devices (such as, client device 150, client device 154, client device 158, etc.), and so on. Controller cluster 110 includes a number of controllers 120. Each controller 120 in controller cluster 110 acts together as a centralized device in WLAN 100. Also, each controller 120 is connected to one or more APs in WLAN 100 via one or more switches (such as, switch 130 and switch 135), and can manage the configurations for the one or more connected APs. Furthermore, each controller 120 in controller cluster 110 shares information of the wireless LAN environment, and provides services with high scalability and availability, low cost of deployment, simplified management, and enhanced security.

In addition, controller cluster 110 may be connected to Internet or an external network via router 160. Router 160 generally refers to a network device that forwards data packets between multiple different networks to create an overlay internetwork.

Moreover, in the exemplary network depicted in FIG. 1A, a number of client devices are connected to the access points in the WLAN. For example, client devices 150-154 are associated with AP 140, and client devices, such as client device 158, are associated with AP 145. Note that, client devices may be connected to the access points via wired or wireless connections.

Also, controller cluster 110 may be connected to a DHCP server 170. The DHCP generally refers to a standardized networking protocol used on Internet Protocol (IP) networks for dynamically distributing network configuration parameters, such as IP addresses for interfaces and services. DHCP server 170 generally provides DHCP services in accordance to the DHCP networking protocol. When DHCP is enabled in WLAN 100, client devices (e.g., client device 150, client device 154, and/or client device 158) request IP addresses and networking parameters automatically from DHCP server 170, and thus reducing the need for a network administrator or a user to configure these settings manually.

During operations, a wireless station, such as client device 150, client device 154, or client device 158, is associated with a respective access point, e.g., AP 140, AP 145, etc. In the example illustrated in FIG. 1A, because the APs are deployed in centralized mode, all network packets originated from client devices will be forwarded to controller cluster 110 for further processing. To do so, each AP in WLAN 100 establishes a secure tunnel, such as Generic Routing Encapsulation (GRE) tunnel 180 between AP 140 and controller cluster 110, and GRE tunnel 185 between AP 145 and controller cluster 110. GRE generally refers to a tunneling protocol that can encapsulate a wide variety of network layer protocols inside virtual point-to-point links over an IP internetwork.

Each AP is connected to an Ethernet switch via one or more ports. As illustrated in FIG. 1A. AP 140 is connected to upstream port 190 of switch 130; and, AP 145 is connected to upstream port 195 of switch 135. During operations, when a packet (e.g., packet 186) from a client device (e.g., client device 150) is received by an AP (e.g., AP 140), the AP will forward the packet (e.g., packet 186) in GRE tunnel 180 to controller cluster 110. Like AP 140, any controller 120 of controller cluster 110 is connected to an upstream switch. The port of the upstream switch that each controller 120 is connected to must be configured to allow all VLANs which clients in WLAN 100 belong to. If, for example, client device 150 is a member of $VLAN_{10}$, but $VLAN_{10}$ is not allowed at the upstream switch port that controller 120 is connected to, then packets transmitted from client device 150 cannot be properly forwarded on the networks.

Figure 1B:
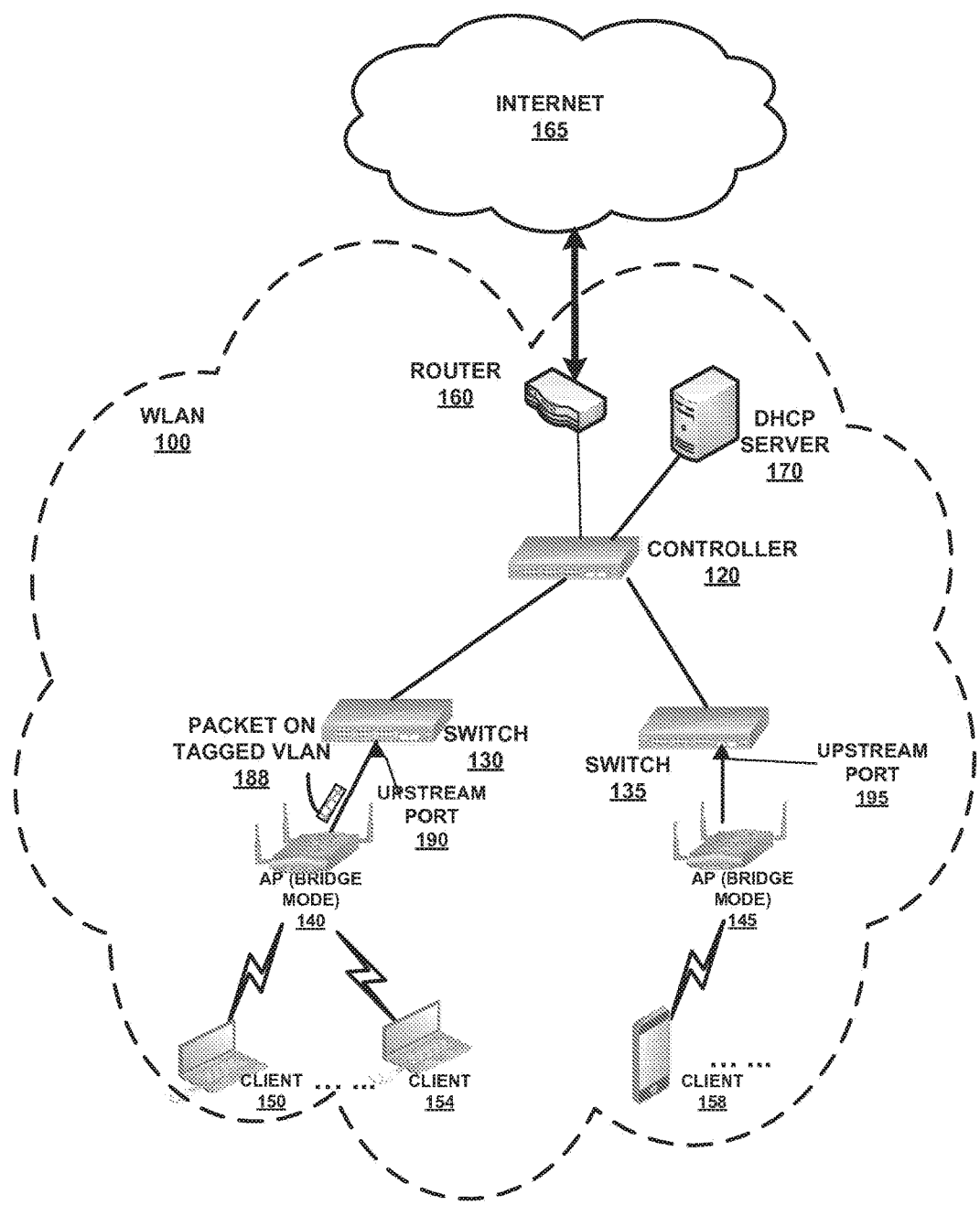

FIG. 1B shows another exemplary computing environment according to embodiments of the present disclosure. Specifically, as illustrated in FIG. 1B, a WLAN 100 includes a controller 120, a router 160, a DHCP server 170, a number of access points (APs) deployed in bridge mode (such as, AP 140, AP 145, etc.), a number of client devices (such as, client device 150, client device 154, client device 158, etc.), and so on. Controller 120 is connected to one or more APs in WLAN 100 via one or more switches (such as, switch 130 and switch 135), and can manage the configurations for the one or more connected APs. In addition, controller 120 may be connected to Internet or an external network via router 160.

Moreover, in the exemplary network depicted in FIG. 1B, a number of client devices are connected to the access points in WLAN 100. For example, client devices 150-154 are associated with AP 140, and client devices, such as client device 158, are associated with AP 145. Note that, client devices may be connected to the access points via wired or wireless connections.

Also, controller 120 and/or APs (e.g., AP 140, AP 145) may be connected to a DHCP server 170. When DHCP is enabled in WLAN 100, client devices (e.g., client device 150, client device 154, and/or client device 158) request IP addresses and networking parameters automatically from DHCP server 170 through their connected AP.

During operations, a wireless station, such as client device 150, client device 154, or client device 158, is associated with a respective access point, e.g., AP 140, AP 145, etc. In the example illustrated in FIG. 1B, because the APs are deployed in the bridge mode, an AP that a client device is connected to will tag all network packets (e.g., packet 188) originated from the client device with a VLAN identifier that corresponds to the client device before forwarding the network packets (e.g., packet 188) to the next hop destination on the route.

Each AP is connected to an Ethernet switch via one or more ports. As illustrated in FIG. 1B, AP 140 is connected to upstream port 190 of switch 130; and, AP 145 is connected to upstream port 195 of switch 135. It is important that upstream port 190 is configured to allow all VLANs which clients 150-154 belong to. Likewise, upstream port 195 must be configured to allow all VLANs which clients 158, etc. belong to. If, for example, client device 150 is a member of $VLAN_{10}$, but $VLAN_{10}$ is not allowed at upstream switch port 190, then packets transmitted from client device 150 cannot be properly forwarded on the networks.

Specifically, an upstream switch port 190 can be configured as operating in either a trunk mode or an access mode. In the access mode of operation, the upstream switch port does not expect any packets tagged with VLAN identifiers. Rather, the packets are received by the access port untagged, and the switch will tag the packet with the access VLAN configured for the access port before forwarding the packet to every other port of the same switch that has the same VLAN allowed. Thus, when an upstream switch port is configured as an access port, the native VLAN of the access point connected to the access port must be configured the same as the access VLAN in order to forward the network packets from the AP properly. On the other hand, in the trunk mode of operation, the upstream switch port is configured with a native VLAN and a number of allowed VLANs. Thus, each of the VLANs associated with the AP connected to the trunk port must be included in the allowed VLANs. Otherwise, switch will not be able to forward the packets from the AP to the networks properly.

FIG. 10 shows another exemplary computing environment according to embodiments of the present disclosure. Specifically, as illustrated in FIG. 10, a WLAN 100 includes a router 160, a DHCP server 170, a number of access points (APs) (such as, AP 140, AP 145, AP 148 etc.) deployed in cluster mode as an AP cluster 115, a number of client devices (such as, client device 150, client device 154, client device 158, etc.), and so on. Note that, WLAN 100 does not include any controller. Rather, the APs in AP cluster 115 self-elect a master AP, which can manage the configurations for the one or more other APs (hereinafter referred to as slave APs). Here, it is assumed that AP 148 is self-elected as master AP to manage slave APs 140-145.

Moreover, in the exemplary network depicted in FIG. 10, a number of client devices are connected to the access points in WLAN 100. For example, client devices 150-154 are associated with master AP 148, client device 156 is associated with slave AP 140; and, client devices, such as client device 158, are associated with AP 145. Note that, client devices may be connected to the access points via wired or wireless connections.

Also, AP cluster 115 may be connected to a DHCP server 170. When DHCP is enabled in WLAN 100, client devices (e.g., client device 150, client device 154, and/or client device 158) request IP addresses and networking parameters automatically from DHCP server 170 through their connected AP.

Figure 1C:
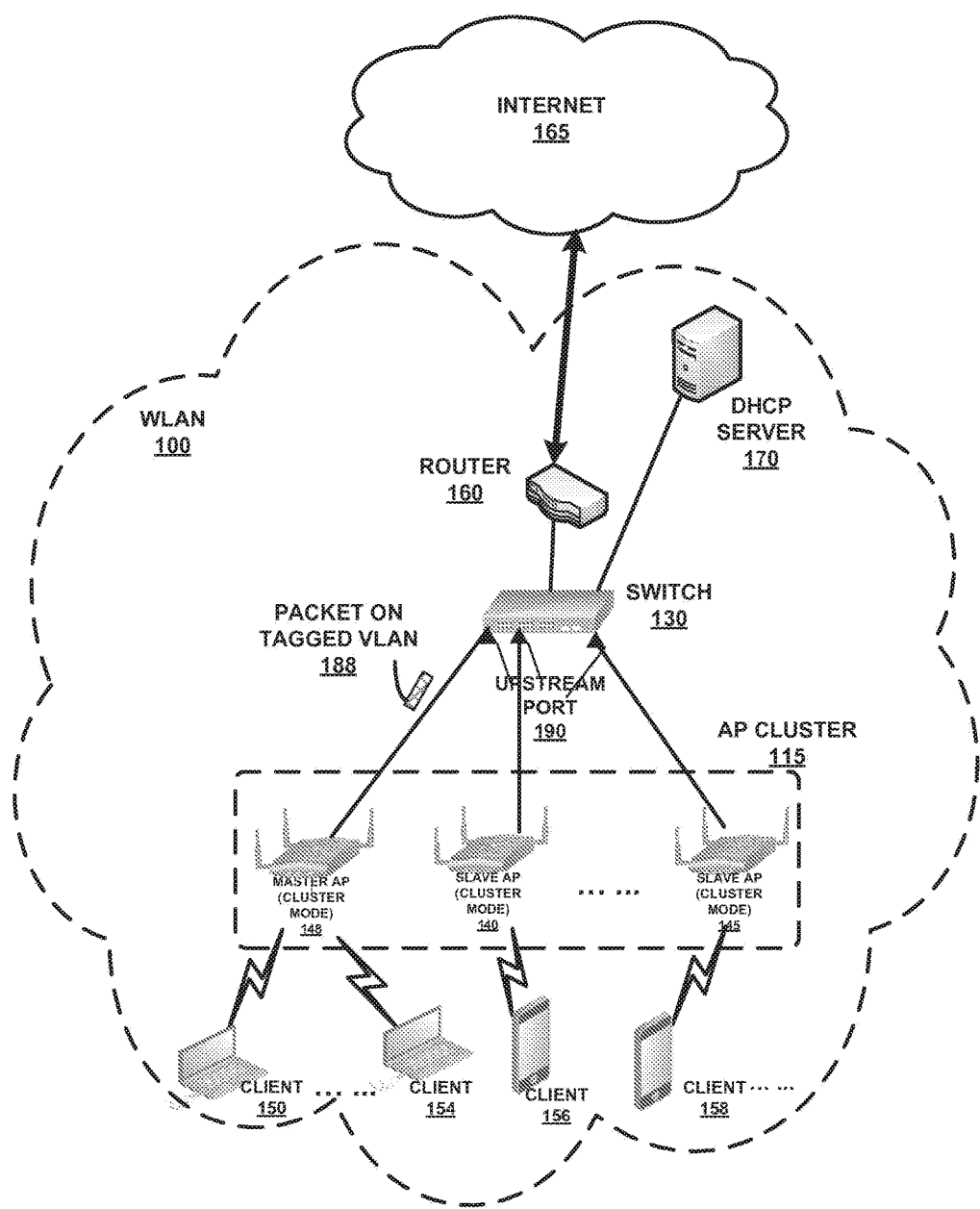

During operations, a wireless station, such as client device 150, client device 154, client device 156, or client device 158, is associated with a respective access point (e.g., AP 140, AP 145, AP 148, etc.). In the example illustrated in FIG. 1C, because the APs are deployed in the cluster mode, a slave AP that a client device is connected to will forward all network packets originated from the client device on a native VLAN to the master AP via an upstream switch.

Each AP is connected to an upstream switch via one or more ports. As illustrated in FIG. 10, AP 148, AP 140, and AP 145 are connected to upstream ports 190 of switch 130. It is important that a respective upstream port 190 that a slave AP is connected to must be configured to allow all VLANs which client devices associated the slave AP belong to. Likewise, a respective upstream port 190 that a master AP is connected to must be configured to allow all VLANs which all client devices in WLAN 100 belong to. If, for example, client device 156 is a member of $VLAN_{10}$, but $VLAN_{10}$ is not allowed at upstream switch ports 190 that slave AP 140 and/or master AP 148 are connected to, then packets (e.g., packet 188) transmitted from client device 150 cannot be properly forwarded on the networks.

Figure 1D:
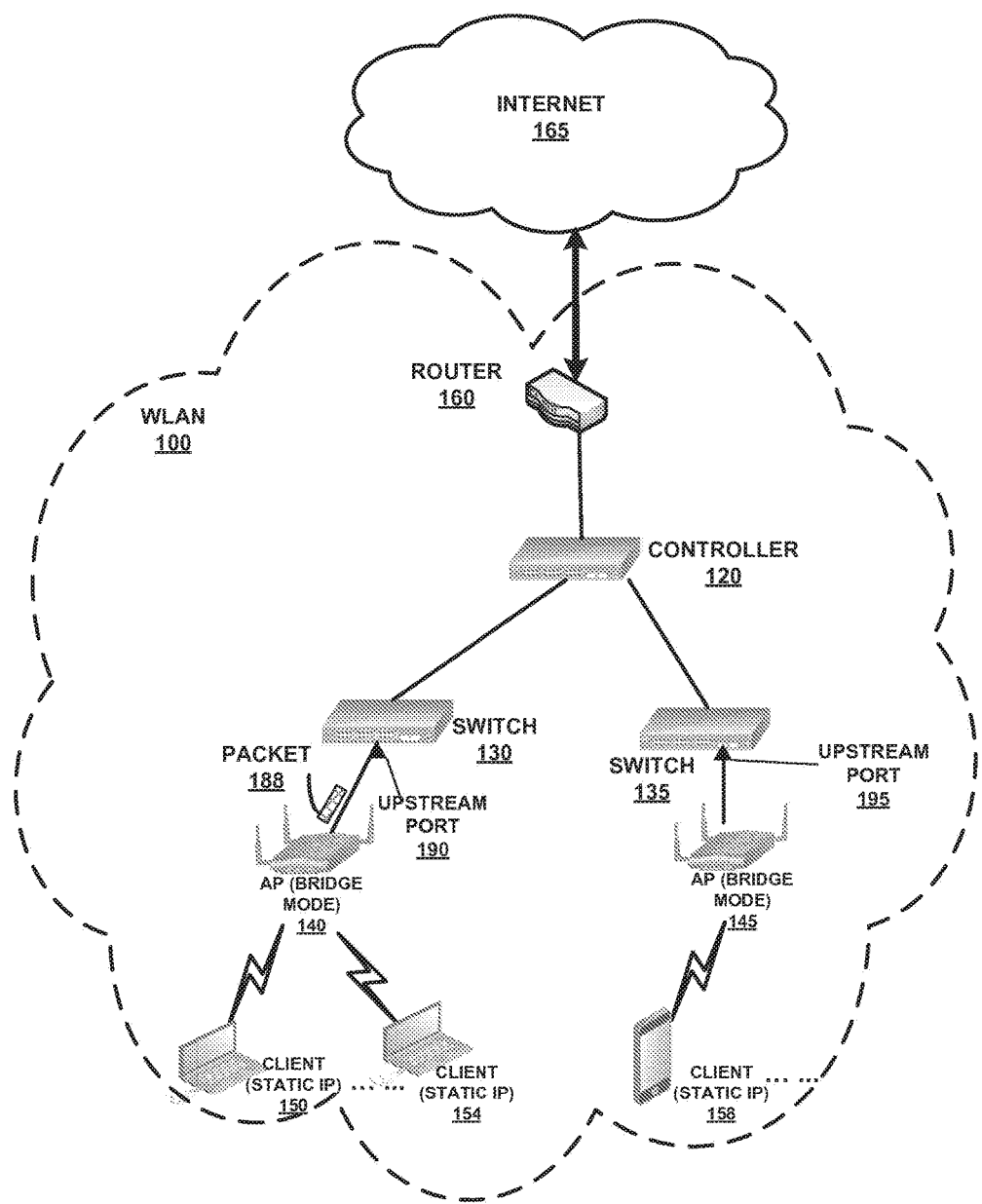

FIG. 1D shows another exemplary computing environment according to embodiments of the present disclosure. Specifically, as illustrated in FIG. 10, a WLAN 100 includes a controller 120, a router 160, a number of access points (APs) deployed in bridge mode (such as, AP 140, AP 145, etc.), a number of client devices (such as, client device 150, client device 154, client device 158, etc.), and so on. Controller 120 is connected to one or more APs in WLAN 100 via one or more switches (such as, switch 130 and switch 135), and can manage the configurations for the one or n ore connected APs. In addition, controller 120 may be connected to Internet or an external network via router 160.

Moreover, in the exemplary network depicted in FIG. 10, a number of client devices are connected to the access points in WLAN 100. For example, client devices 150-154 are associated with AP 140, and client devices, such as client device 158, are associated with AP 145. Note that, client devices may be connected to the access points via wired or wireless connections.

Also, because there is no DHCP server in WLAN 100, client devices (e.g., client device 150, client device 154, and/or client device 158) are assigned with static IP addresses. During operations, a wireless station, such as client device 150, client device 154, or client device 158, is associated with a respective access point, e.g., AP 140, AP 145, etc. In the example illustrated in FIG. 1D, because the APs are deployed in the bridge mode, an AP that a client device is connected to will tag all network packets (e.g., packet 188) originated from the client device with a VLAN identifier that corresponds to the client device before forwarding the network packets (e.g., packet 188) to the next hop destination on the route.

Each AP is connected to an Ethernet switch via one or more ports. As illustrated in FIG. 10, AP 140 is connected to upstream port 190 of switch 130; and, AP 145 is connected to upstream port 195 of switch 135. It is important that upstream port 190 is configured to allow all VLANs which clients 150-154 belong to. Likewise, upstream port 195 must be configured to allow all VLANs which clients 158, etc. belong to. If, for example, client device 150 is a member of $VLAN_{10}$, but $VLAN_{10}$ is not allowed at upstream switch port 190, then packets transmitted from client device 150 cannot be properly forwarded on the networks.

Network according to embodiments of the present disclosure may operate on a private network including one or more local area networks. The local area networks may be adapted to allow wireless access, thereby operating as a wireless local area network (WLAN). In some embodiments, one or more networks may share the same extended service set (ESS) although each network corresponds to a unique basic service set (BSS) identifier.

In addition, networks depicted in FIGS. 1A-1D may include multiple network control plane devices, such as network controllers, access points or routers capable of controlling functions, etc. Each network control plane device may be located in a separate sub-network. The network control plane device may manage one or more network management devices, such as access points or network servers, within the sub-network.

Although only a few use case scenarios are illustrated in FIGS. 1A-1D, it shall be understood that the solution described herein can be applicable to many other similar use case scenarios without departing from the spirit of present invention.

VLAN Mismatch Detection by Monitoring

Figure 2A:
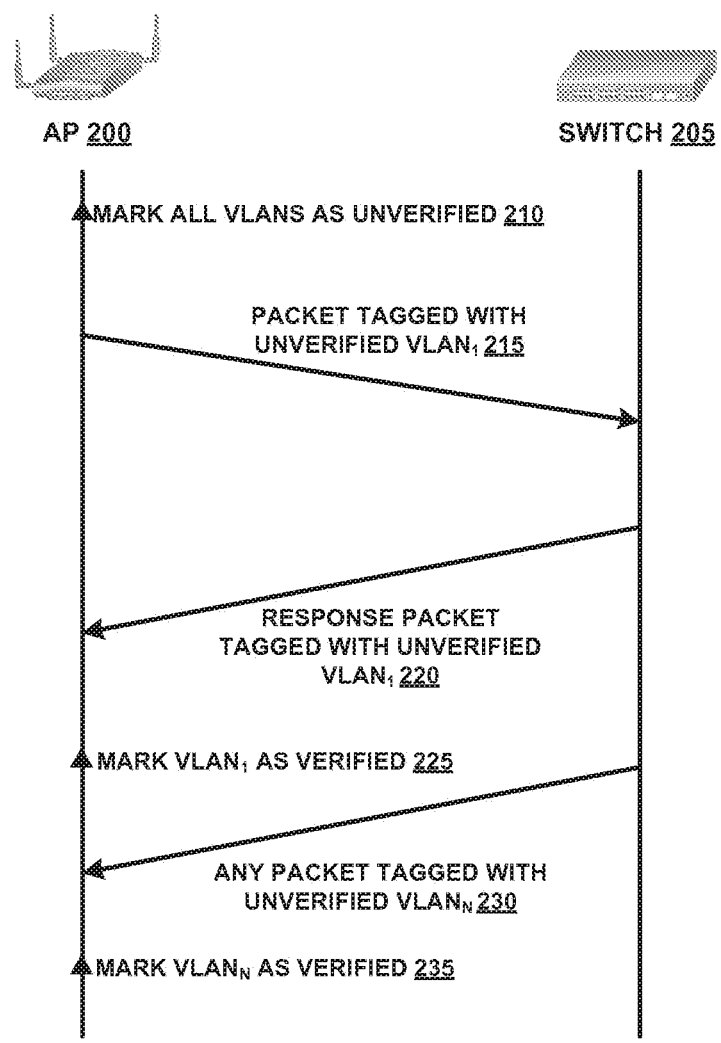
FIGS. 2A-2C are exemplary sequence diagrams illustrating detection of mismatched VLANs according to embodiments of the present disclosure.

FIG. 2A is an exemplary sequence diagram illustrating detection of mismatched VLANs by monitoring according to embodiments of the present disclosure. Hence, an AP can snoop packets received from an upstream switch to determine whether a particular VLAN is allowed by the upstream switch port.

Specifically, FIG. 2A includes at least an AP 200 and a switch 205 that are physically connected to each other but separately managed. Thus, AP 200 possesses no information (e.g., whether the upstream switch port is an access port or a trunk port, which VLANs are allowed by the upstream port, etc.) of its upstream port at switch 205. Neither is there any standardized communication protocol between AP 200 and switch 205 to communicate such upstream port information.

Initially, AP 200 marks all VLANs as unverified VLANs 210. The VLANs can be statically configured for AP 200 by a network administrator or dynamically configured as a per-user based VLAN by an authentication server (e.g., a RADIUS server). The unverified VLAN status indicates that AP 200 has no information regarding whether its upstream switch port has allowed a particular VLAN. AP 200 then starts forwarding packets to switch 205 that are tagged with unverified VLANs (e.g., packet tagged with unverified $VLAN_1$ 215). If, at any point of time, AP 200 receives a response packet tagged with an unverified VLAN (e.g., response packet tagged with unverified $VLAN_1$ 220), AP 200 will mark the corresponding VLAN as verified (e.g., AP 200 marks $VLAN_1$ as verified 225 upon receiving response packet 220). In general, if AP 200 receives any packet tagged with unverified $VLAN_N$ 230, AP 200 will mark $VLAN_N$ as a verified VLAN 235. The verified VLAN status indicates that the upstream switch port of switch 205 has allowed the particular VLAN.

Thus, each AP in the WLAN (e.g., AP 200) can maintain its own list of unverified VLANs and/or verified VLANs. The list is specific to each AP and can be maintained locally at the AP. When AP 200 subsequently receives a connection request from a client device assigned to an unverified VLAN, AP 200 may instantly transmit a notification to the client device. The notification may indicate that the upstream switch port is not correctly configured to allow the particular VLAN. Thus, the user of the client device can have the necessary information to make the corrections for the VLAN configuration of switch 205. The advantage of this approach is that the solution has very little overhead, because AP 200 only snoops received network packet in order to maintain the unverified and/or verified VLAN lists. In majority of use case scenarios, if AP 200 has not received a single packet on a particular VLAN from an upstream switch 205, most likely this is due to the VLAN is not configured as an allowed VLAN at the upstream switch port.

When a client device connected to the WLAN and reports to an IT administrator that the client device encountered connectivity issues. The IT administrator can find out the notification in the system log to find out specific information about the connectivity issue, including whether the connectivity issue is caused by mismatched VLAN configurations between the AP and the switch.

VLAN Mismatch Detection by Proactive Probing

Figure 2B:
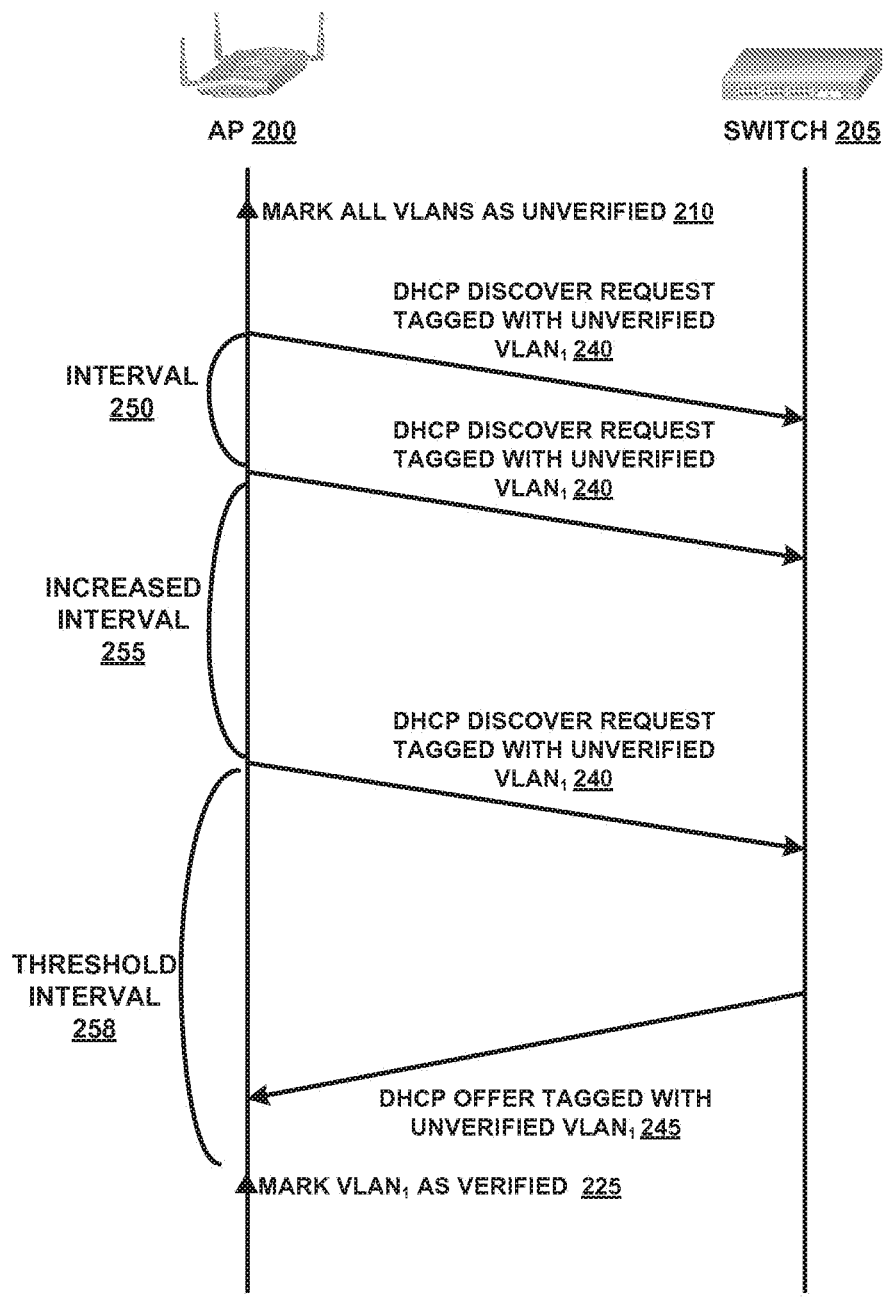

FIG. 2B is an exemplary sequence diagram illustrating detection of mismatched VLANs by proactive probing according to embodiments of the present disclosure. Thus, an AP may proactively transmit packets to a switch for the purpose of seeking information regarding whether a particular VLAN is allowed by an upstream switch port. Usually, when a particular VLAN is an allowed VLAN at the upstream switch port, an AP connected to the upstream switch port will likely receive many multicast and/or broadcast packets on the particular VLAN. For example, DHCP packets and/or ARP packets can all be tagged with the particular VLAN identifier. Thus, besides monitoring such packets, an AP can proactively transmitting, e.g., DHCP probing packets to determine whether a particular VLAN is allowed by an upstream switch port.

Specifically, FIG. 2B includes at least an AP 200 and a switch 205 that are physically connected but separately managed. Initially, AP 200 marks all VLANs configured on AP 200 as unverified VLANs 210. The VLANs can be statically configured by a network administrator. The unverified VLAN status indicates that AP 200 has no information regarding whether its upstream switch port has allowed a particular VLAN. For example, assuming that AP 200 is configured with $VLAN_1$, $VLAN_2$, $VLAN_3$, and $VLAN_4$. Then, AP 200 can transmit a DHCP DISCOVER request tagged with each of the unverified VLANs (e.g., DHCP DISCOVER request tagged with unverified $VLAN_1$ 240) to switch 205. If AP 200 fails to receive a reply within a predefined interval 250, AP 200 will retransmit DHCP DISCOVER request tagged with unverified $VLAN_1$ 240 to switch 205. Next, AP 200 increases the interval value from interval 250 to an increased interval 255, and waits for an extended period of time. If AP 200 still fails to receive a reply within interval 255, AP 200 will continue increasing the interval value, for example, exponentially, until the interval value exceeds a predetermined threshold interval 258. If a DHCP OFFER tagged with unverified $VLAN_1$ 245 has been received by AP 200, AP 200 will mark $VLAN_1$ as a verified VLAN 225. If, on the other hand, AP 200 fails to receive any reply from switch 205 to DHCP DISCOVER request 240 on unverified VLAN1, then $VLAN_1$ will remain on the unverified list and AP 200 will stop transmitting DHCP DISCOVER request tagged with unverified $VLAN_1$ 240 to switch 205.

Therefore, by proactively transmitting network probing packets, an AP can force a packet response to be transmitted on a particular VLAN if the corresponding packet request on the same VLAN has been received properly by an upstream switch. Based on whether the packet response is received, the AP can determine whether a particular VLAN is verified or unverified prior to a client device belonging to the particular VLAN connects to the AP.

If AP 200 cannot verify a particular VLAN by the time when the threshold interval 258 is reached, AP 200 can send a notification when a client device belonging to the particular VLAN first attempts to connect to AP 200. The notification will indicate to the client device that the particular VLAN is not verified to be allowed by an upstream switch port, and recommends an administrator to check the configuration for AP 200's upstream port at switch 205. In some embodiments, AP 200 can continuously alert an administrator that a VLAN mismatch has been detected between AP 200 and switch 205 once threshold interval 258 has been exceeded. In some embodiments, AP 200 can continuously alert an administrator that a VLAN mismatch has been detected between AP 200 and switch 205 from the beginning of the process until the particular VLAN is verified. Once the particular VLAN is verified, AP 200 will stop alerting the administrator.

Note that, FIG. 2B only provides one specific example for illustration purposes. Other ways of transmitting proactive probing packets may be utilized as well. For example, the DHCP DISCOVER requests can be sent at a fixed interval for a predetermined period of time. As another example, the interval at which AP 200 transmits the DHCP DISCOVER requests can increase after each fixed time period. For example, during the 1st minute, AP 200 will transmit the DHCP DISCOVER requests every 5 seconds; during the 2nd minute, AP 200 will transmit the DHCP DISCOVER requests every 10 seconds; etc.

VLAN Mismatch Detection where No DHCP is Present

Figure 2C:
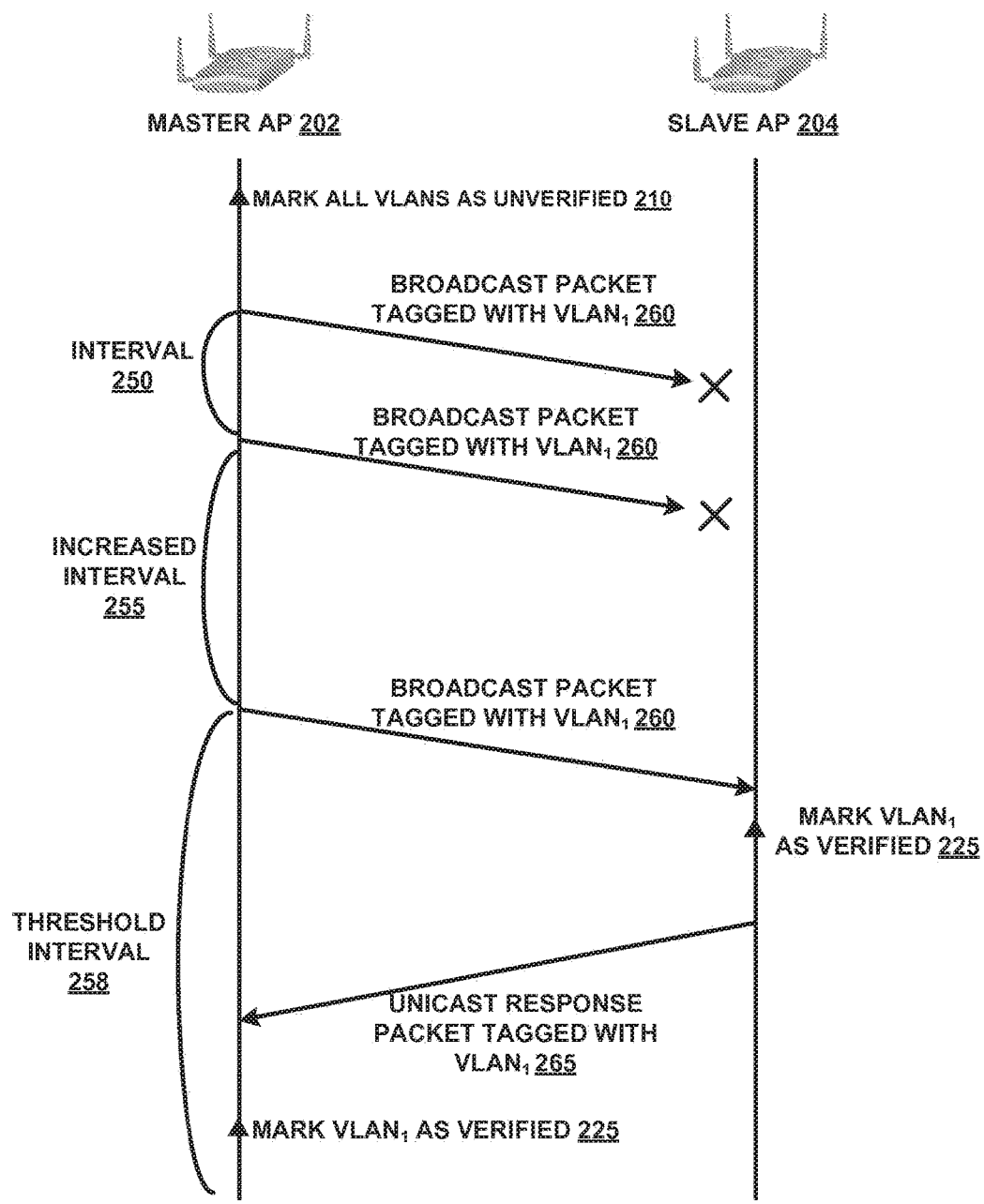

FIG. 2C is an exemplary sequence diagram illustrating detection of mismatched VLANs according to embodiments of the present disclosure. When a VLAN is used only for client devices with static IP addresses where there is no DHCP server in the WLAN, the system can transmit a layer-2 packet on every VLAN, and determine if a response packet on the same VLAN is received from a slave AP by a master AP. The layer-2 packet may specify a particular subtype such that the receiver of the packet understands that the packet is used for VLAN mismatch detection, and will transmit a reply on the same VLAN with the same subtype. If both the slave AP and the master AP receive a packet on the same VLAN, then the VLAN is marked as a verified VLAN.

Specifically, FIG. 2O includes master AP 202 and slave AP 204 that are physically connected and belong to the same AP cluster. Note that, master AP 202 is self-elected to manage one or more slave APs (including slave AP 204) in the AP cluster. Initially, both master AP 202 and slave AP 204 mark all VLANs as unverified VLAN 210. Then, master AP 202 will periodically broadcast a packet on each of the unverified VLANs configured on master AP 202. For example, master AP 202 can broadcast a packet tagged with $VLAN_1$ 260 to other slave APs (including slave AP 204) in the AP cluster.

Every slave AP in the same AP cluster should be able to receive broadcast packet tagged with $VLAN_1$ 260 if its upstream switch port is configured to allow $VLAN_1$. If, however, packet 260 fails to be received by slave AP 204, causing master AP 202 fail to receive a response packet from any slave AP, master AP 202 will continue broadcasting packet tagged with $VLAN_1$ 260 to the slave APs. In the example illustrated in FIG. 2O, master AP 202 will transmit another broadcast packet tagged with VLAN 260 after a predetermined interval 250. If still no response packet is received, master AP 202 will continue transmitting broadcast packet tagged with $VLAN_1$ 260 at increased interval 255 until a threshold interval 258 is received.

Whenever a slave AP, e.g., slave AP 204, receives a packet on a particular VLAN (e.g., broadcast packet tagged with $VLAN_1$ 260), slave AP 204 will immediately mark the particular VLAN (e.g., $VLAN_1$) as a verified VLAN 225. Subsequently, slave AP 204 will transmit a unicast response tagged with $VLAN_1$ 265 to master AP 202. When master AP 202 receives unicast response 265 from slave AP 204, master AP 202 will mark $VLAN_1$ as a verified VLAN 225.

Note that, because all APs in the same AP cluster should have the same set of VLANs configured at their respective upstream switch port, only one AP (e.g., master AP 202) needs to be sending broadcast packets on all VLANs.

VLAN Mismatch Correction

Figure 3:
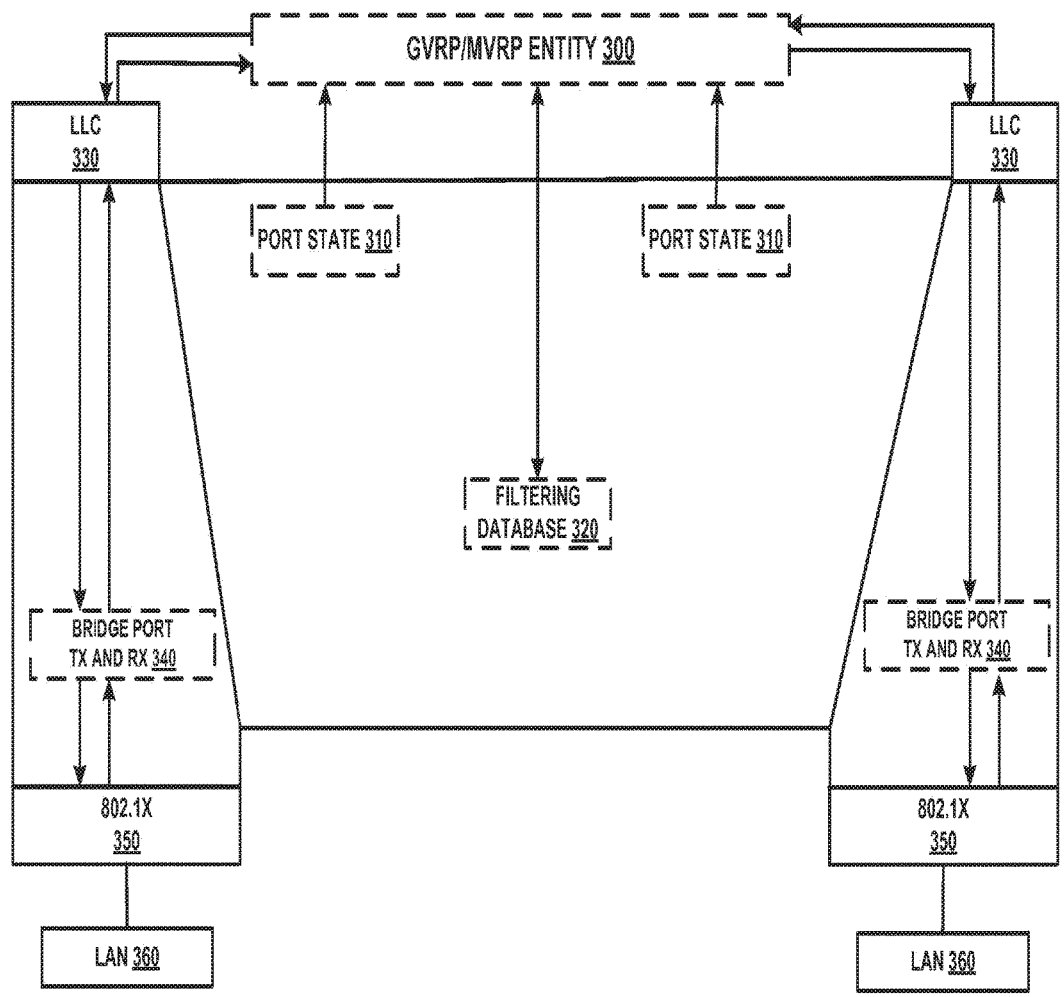
FIG. 3 illustrates exemplary network protocol for correcting VLAN mismatches according to embodiments of the present disclosure.

Upon completing the aforementioned various detection processes, an AP may still have a few VLANs that are unverified. FIG. 3 illustrates exemplary network protocol for correcting VLAN mismatches according to embodiments of the present disclosure. Specifically, a network protocol, e.g., Generic VLAN Registration Protocol (GVRP) in accordance with IEEE 802.10-2005 standard and/or Multiple VLAN Registration Protocol (MVRP) in accordance with IEEE 802.1ak, can be utilized for an AP to notify an upstream switch to self-correct its VLAN configurations by adding an unverified VLAN to its allowed VLAN set. In some embodiments, an AP can check a parameter that indicates whether its upstream switch supports GVRP and/or MVRP. The AP will send out a GVRP and/or MVRP request for adding the unverified VLAN only if the upstream switch supports GVRP and/or MVRP. In some embodiments, an AP may be transmitting a GVRP and/or MVRP request for all of its unverified VLANs and allow the upstream switch to drop the packet if GVRP and/or MVRP is not supported by the upstream switch.

Within a layer 2 network, GVRP and/or MVRP provides a mechanism for dynamically sharing VLAN information and configuring one or more particular VLANs. For example, in order to add a switch port to a VLAN, only the end port, or the VLAN-supporting network device connected to the switch port, needs to be reconfigured. All necessary VLAN trunks are dynamically created on the other GVRP- and/or MVRP-enabled switches.

Specifically, FIG. 3 includes a GVRP and/or MVRP entity 300 that provides a layer 2 VLAN registration network protocol between two Logical Link Control (LLC) interfaces. GVRP/MVRP entity 300 receives port state information 310. Port state information 310 includes, but is not limited to, dynamic configuration and distribution of VLAN membership information; static configuration of VLAN membership information via Management mechanisms, which allow configuration of Static VLAN Registration Entries; combined static and dynamic configuration, in which some VLANs are configured via Management mechanisms and other VLANs are configured through a dynamic VLAN registration protocol.

Moreover, through GVRP and/or MVRP, Dynamic VLAN entries will be updated in a Filtering Database 320. Therefore, GVRP and/or MVRP facilitate maintenance of VLAN configuration dynamically based on current network configurations.

Further, GVPR and/or MVRP typically define an application that provides the VLAN registration service. For example, MVRP uses MRP Attribute Declaration (MAD) and MRP Attribute Propagation (MAP), which provide the common state machine descriptions and the common information propagation mechanisms defined for use in MRP-based applications.

Also, such VLAN registration protocols typically provide a mechanism for dynamic maintenance of the contents of Dynamic VLAN Registration Entries for each VLAN, and for propagating the information (e.g., bridge port Tx and Rx information 340) to other bridges through 802.1X interface 350 in LAN 360. This information allows MVRP-aware devices to dynamically establish and update their knowledge of the set of VLANs that currently have active members, and through which ports those members can be reached.

Note that, upon GVRP/MVRP completes the configuration for the unverified VLAN at the upstream switch port, the VLAN mismatch detection processes describe above would automatically starts to detect packets being transmitted on the previously unverified VLANs, and hence automatically updates those unverified VLANs to become verified VLANs.

Processes for VLAN Mismatch Detection in Networks

Figure 4A:
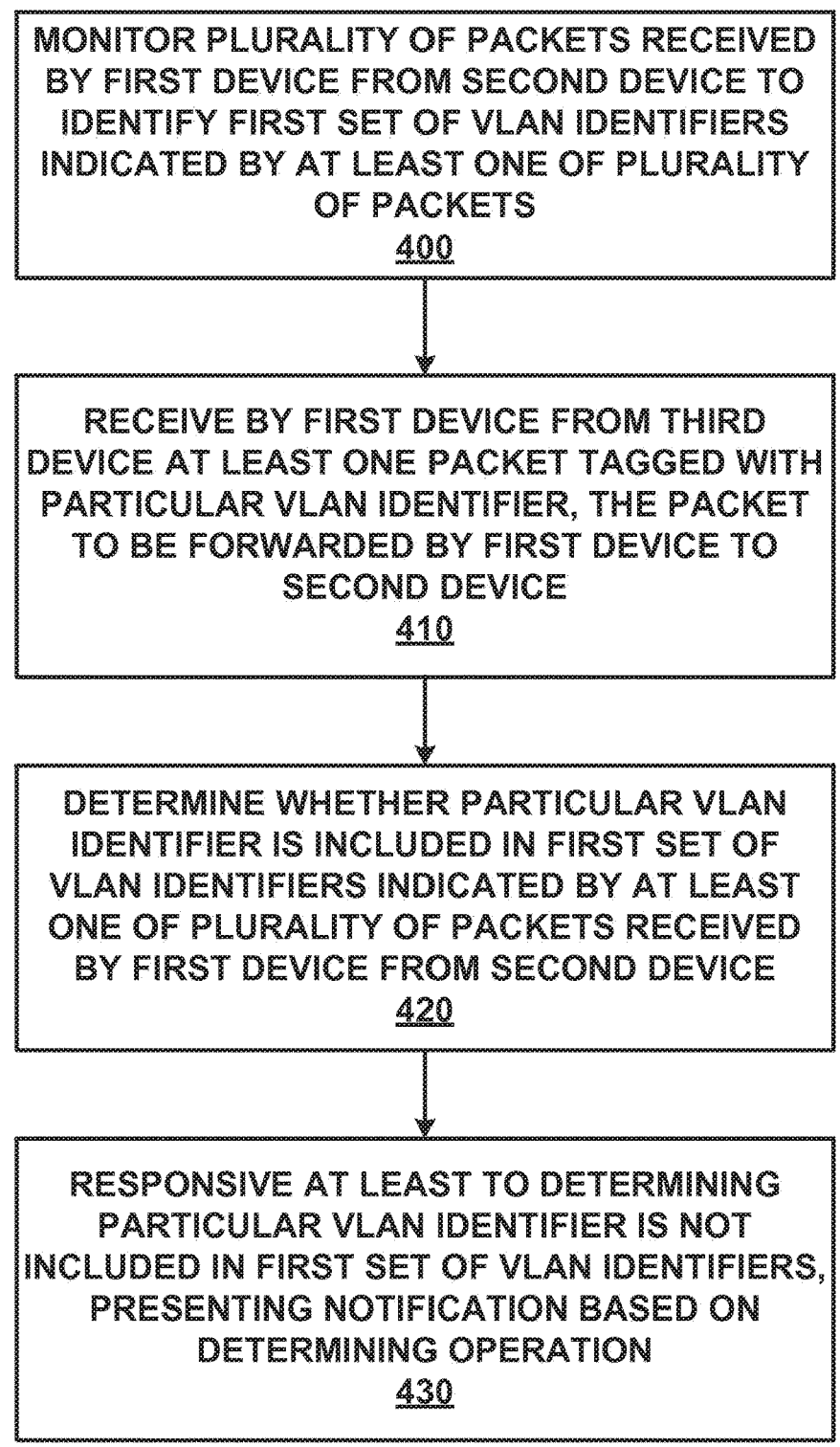
FIGS. 4A-4C illustrate exemplary processes for VLAN mismatch detection in networks according to embodiments of the present disclosure.
Figure 4B:
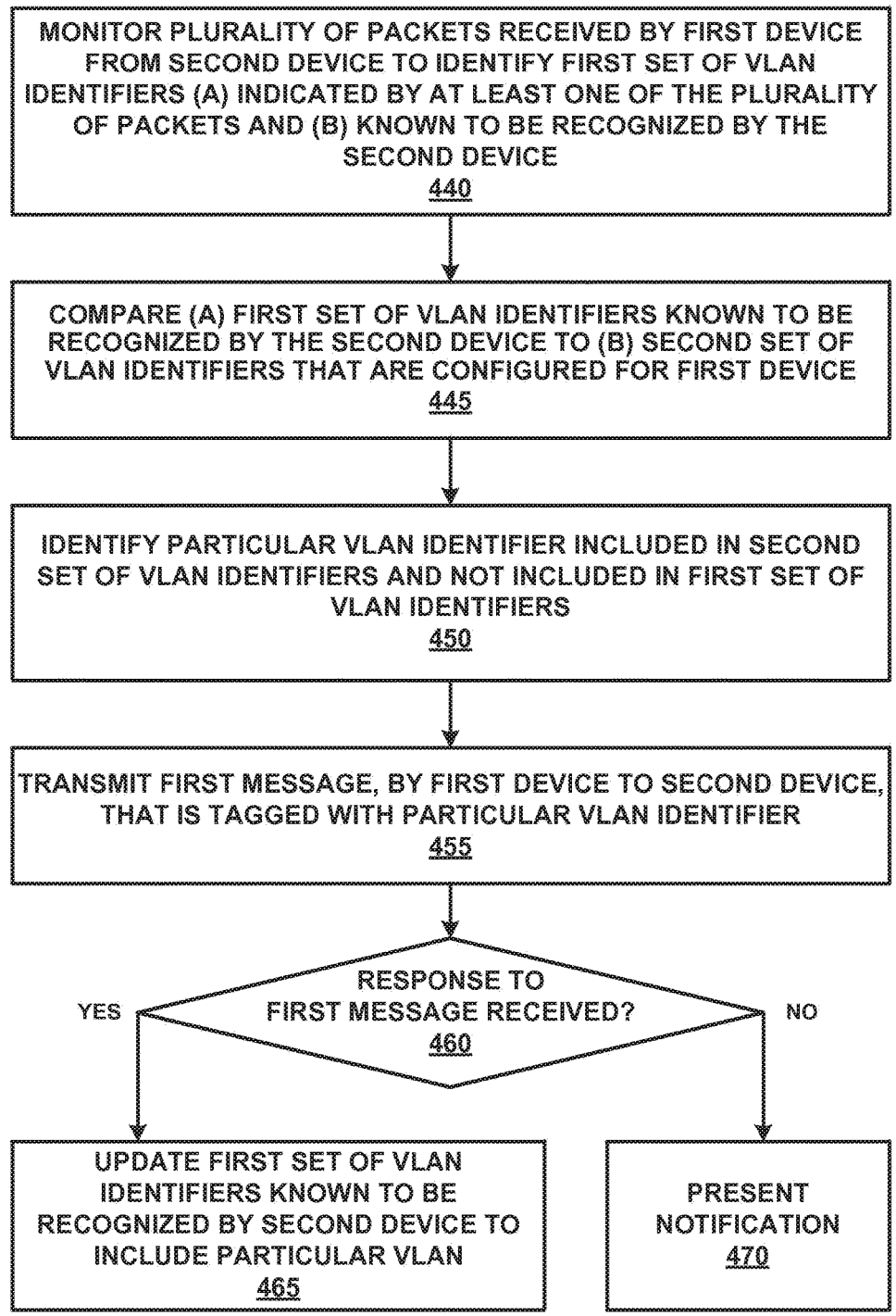
Figure 4C:
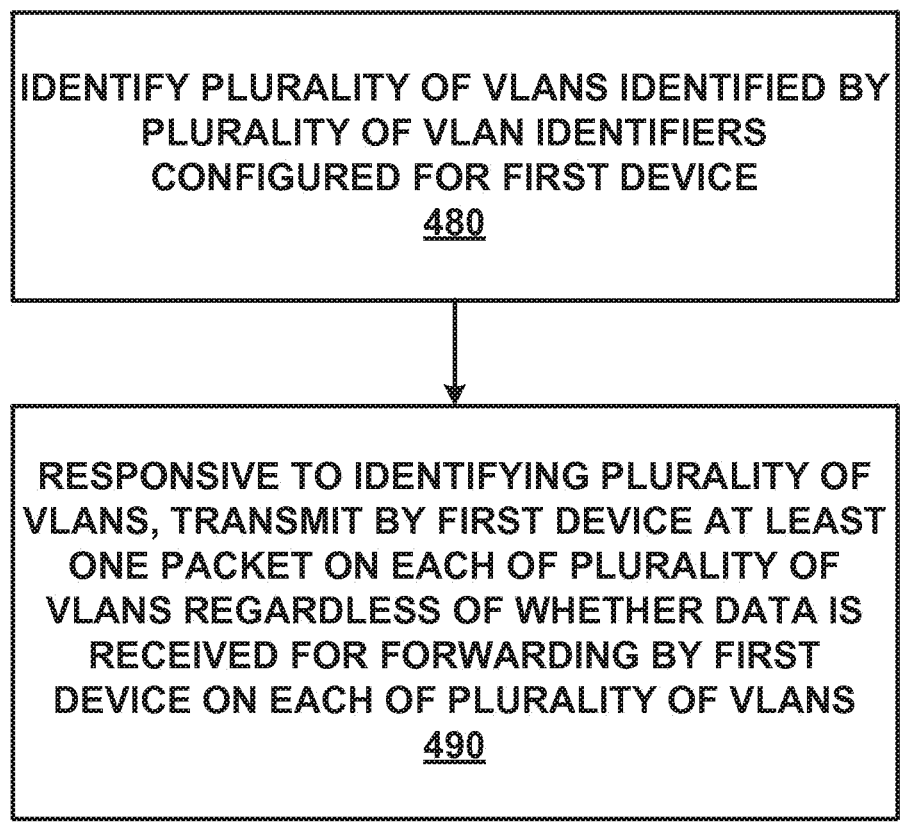

FIGS. 4A-4C illustrate exemplary processes for VLAN mismatch detection in networks according to embodiments of the present disclosure.

Specifically, FIG. 4A illustrates an exemplary process for VLAN mismatch detection via monitoring according to embodiments of the present disclosure. During operations, a network device monitors a plurality of packets received by a first device from a second device to identify a first set of VLAN identifiers indicated by at least one of the plurality of packets (operation 400). The network device then receives from a third device at least one packet tagged with a particular VLAN identifier, whereas the at least one packet to be forwarded by the first device to the second device (operation 410). Furthermore, the network device determines whether the particular VLAN identifier is included in the first set of VLAN identifiers indicated by at least one of the plurality of packets received by the first device from the second device (operation 420). Responsive at least to determining that the particular VLAN identifier is not included in the first set of VLAN identifiers, the network device presents a notification based on the determination (operation 430).

In some embodiments, the notification includes a warning that the particular VLAN identifier may not be recognized by the second device. In some embodiments, the notification includes a warning that the particular VLAN identifier may not be recognized on a port of the second device to which messages, tagged with the particular VLAN identifier, are being forwarded by the first device.

In some embodiments, the network device further determines whether the particular VLAN identifier is included in the first set of VLAN identifiers is performed responsive to determining that the request message did not receive the response message. In addition, the network device can determine that a request message, received from the first device and forwarded by the second device to the third device, did not receive a response message, whereas the request message is tagged with the particular VLAN identifier. Note that, the request message comprises a DHCP Discover message. Responsive to determining that the particular VLAN identifier is not included in the first set of VLAN identifiers, the network device then transmits a message that causes the second device to be configured to accept messages tagged with the particular VLAN identifier. Note that, the VLANs can be either statically configured by a network administrator or dynamically derived on a per-client basis according to communications with an authentication server (e.g., a RADIUS server).

Furthermore, FIG. 4B illustrates an exemplary process for VLAN mismatch detection via proactive probing according to embodiments of the present disclosure. During operations, a network device monitors a plurality of packets received by a first device from a second device to identify a first set of VLAN identifiers (a) indicated by at least one of the plurality of packets and (b) known to be recognized by the second device (operation 440). The network device further compares (a) the first set of VLAN identifiers known to be recognized by the second device to (b) a second set of VLAN identifiers that are configured for the first device (operation 445). Then, the network device identifies a particular VLAN identifier included in the second set of VLAN identifiers and not included in the first set of VLAN identifiers (operation 450). Also, the network device transmits a first message, by the first device to the second device, whereas the first message is tagged with the particular VLAN identifier (operation 455). The network device determines whether a second message that is responsive to the first message has been received (operation 460). If so, the network device updates the first set of VLAN identifiers known to be recognized by the second device to include the particular VLAN (operation 465). Responsive to not receiving any message that is responsive to the first message, the network device presents a notification (operation 470). In some embodiments, the network device updates the first set of VLAN identifiers responsive to the second message being tagged with the particular VLAN identifier.

In some embodiments, the notification includes a warning that the particular VLAN identifier may not be recognized by the second device. In some embodiments, the notification includes a warning that the particular VLAN identifier may not be recognized on a port of the second device to which messages, tagged with the particular VLAN identifier, are being forwarded by the first device. Also, the first message can be a test for determining whether the second device recognizes the particular VLAN identifier.

In some embodiments, responsive to not receiving any message that is responsive to the first message, the network device transmits a message that causes the second device to be configured to accept messages tagged with the particular VLAN identifier.

In some embodiments, the first message is of a particular type that is recognized by the second device as a VLAN detection message. Specifically, the VLAN detection message requires a recipient of the message immediately transmit a response on same VLAN to the sender of the message.

In some embodiments, the first message can be a DHCP Discover message that is generated by the first device to determine whether the second device recognizes the particular VLAN identifier.

In addition, FIG. 4C illustrates an exemplary process for VLAN mismatch detection with a cluster of network devices according to embodiments of the present disclosure. During operations, a network device identifies a plurality of VLANs identified by a plurality of VLAN identifiers configured for a first device (operation 480). Responsive to identifying the plurality of VLANs, the network device transmits at least one packet on each of the plurality of VLANs regardless of whether data is received for forwarding by the network device on each of the plurality of VLANs (operation 490). In some embodiments, the network device further configures the first device to accept packets tagged with any of the plurality of VLAN identifiers.

In some embodiments, a primary access point (e.g., a master AP) broadcasts at least one packet on each of the plurality of VLANs, and the at least one packet may be received by a set of one or more secondary access points. Note that, the primary access point can broadcast the at least one packet periodically. Furthermore, the broadcasting operation may be performed in response to one or more of: (a) when a new VLAN identifier is configured for the first device; and (b) when a new device is added in a system of devices.

In some embodiments, the first device can be a controller that broadcasts the plurality of VLAN identifiers to other controllers in a controller cluster.

System for VLAN Mismatch Detection in Networks

Figure 5:
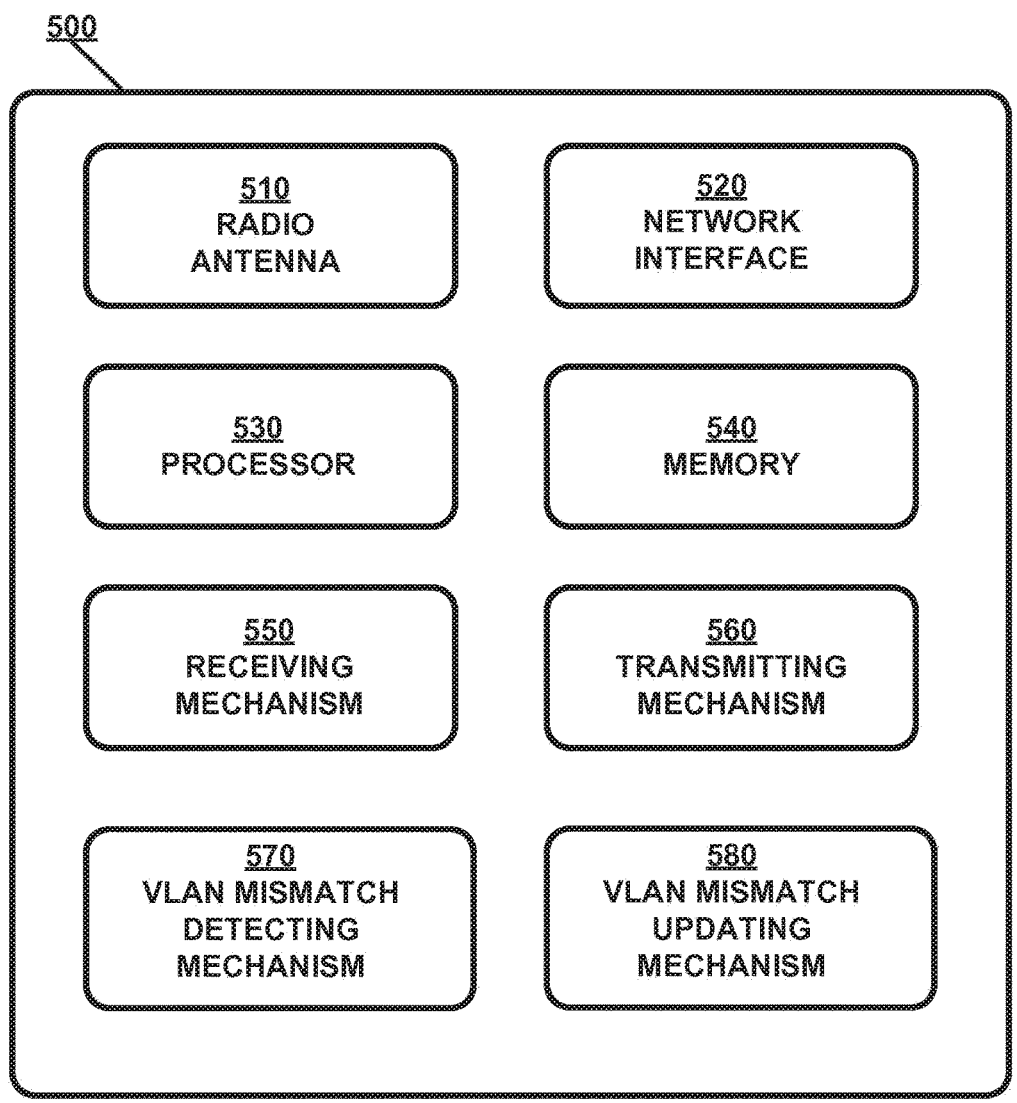
FIG. 5 is a block diagram illustrating an exemplary system for VLAN mismatch detection in networks according to embodiments of the present disclosure.

FIG. 5 is a block diagram illustrating a system for VLAN mismatch detection in networks according to embodiments of the present disclosure.

Network device 500 includes at least one or more radio antennas 510 capable of either transmitting or receiving radio signals or both, a network interface 520 capable of communicating to a wired or wireless network, a processor 530 capable of processing computing instructions, and a memory 540 capable of storing instructions and data. Moreover, network device 500 further includes an receiving mechanism 550, a transmitting mechanism 560, a VLAN mismatch detecting mechanism 570, and a VLAN mismatch updating mechanism 580, all of which are in communication with processor 530 and/or memory 540 in network device 500. Network device 500 may be used as a client system, or a server system, or may serve both as a client and a server in a distributed or a cloud computing environment.

Radio antenna 510 may be any combination of known or conventional electrical components for receipt of signaling, including but not limited to, transistors, capacitors, resistors, multiplexers, wiring, registers, diodes or any other electrical components known or later become known.

Network interface 520 can be any communication interface, which includes but is not limited to, a modem, token ring interface, Ethernet interface, wireless IEEE 802.11 interface, cellular wireless interface, satellite transmission interface, or any other interface for coupling network devices.

Processor 530 can include one or more microprocessors and/or network processors. Memory 540 can include storage components, such as, Dynamic Random Access Memory (DRAM), Static Random Access Memory (SRAM), etc.

Receiving mechanism 550 generally receives one or more network messages via network interface 520 or radio antenna 510 from a wireless client. The received network messages may include, but are not limited to, requests and/or responses, beacon frames, management frames, control path frames, and so on. Specifically, receiving mechanism 550 can receive, by a first device from a third device, at least one packet tagged with a particular VLAN identifier, whereas the at least one packet to be forwarded by the first device to a second device.

Transmitting mechanism 560 generally transmits messages, which include, but are not limited to, requests and/or responses, beacon frames, management frames, control path frames, and so on. Specifically, transmitting mechanism can transmit a first message, by the first device to the second device, whereas the first message is tagged with the particular VLAN identifier.

Furthermore, responsive to not receiving any message that is responsive to the first message, transmitting mechanism 560 can transmit a message that causes the second device to be configured to accept messages tagged with the particular VLAN identifier.

In some embodiments, responsive to determining that the particular VLAN identifier is not included in a set of verified VLAN identifiers, transmitting mechanism 560 transmits a message that causes the second device to be configured to accept messages tagged with the particular VLAN identifier.

In some embodiments, responsive to identifying a plurality of unverified VLANs, transmitting mechanism 560 transmits at least one broadcast packet on each of the plurality of VLANs regardless of whether data is received for forwarding by the first device on each of the plurality of VLANs. The broadcasting operation may be performed by a primary access point and received by a set of one or more secondary access points periodically. Also, the broadcasting operation may be performed in response to one or more of: (a) when a new VLAN identifier is configured for the first device; and (b) when a new device is added in a system of devices. In some embodiments, the first device is a controller that broadcasts the plurality of VLAN identifiers to other controllers in the same controller cluster.

VLAN mismatch detecting mechanism 570 generally detects a VLAN configuration mismatch between an access point or a controller in a wireless network and a switch in a wired network.

Specifically, VLAN mismatch detecting mechanism 570 can monitor a plurality of packets received by a first device from a second device to identify a first set of VLAN identifiers indicated by at least one of the plurality of packets. Also, VLAN mismatch detecting mechanism 570 can determine whether the particular VLAN identifier is included in the first set of VLAN identifiers indicated by at least one of the plurality of packets received by the first device from the second device. Responsive at least to determining that the particular VLAN identifier is not included in the first set of VLAN identifiers, VLAN mismatch detecting mechanism 570 can present a notification. The notification may include a warning that the particular VLAN identifier may not be recognized by the second device. Also, the notification can include a warning that the particular VLAN identifier may not be recognized on a port of the second device to which messages, tagged with the particular VLAN identifier, are being forwarded by the first device.

According to some embodiments, VLAN mismatch detecting mechanism 570 can determine that a request message, received from the first device and forwarded by the second device to the third device, did not receive a response message, whereas the request message is tagged with the particular VLAN identifier. Further, VLAN mismatch detecting mechanism 570 can determine whether the particular VLAN identifier is included in the first set of VLAN identifiers is performed responsive to determining that the request message did not receive the response message. Note that, the request message comprises a DHCP Discover message.

According to some embodiments, VLAN mismatch detecting mechanism 570 monitors a plurality of packets received by a first device from a second device to identify a first set of VLAN identifiers (a) indicated by at least one of the plurality of packets and (b) known to be recognized by the second device. Then, VLAN mismatch detecting mechanism 570 compares (a) the first set of VLAN identifiers known to be recognized by the second device to (b) a second set of VLAN identifiers that are configured for the first device. Also, VLAN mismatch detecting mechanism 570 can identify a particular VLAN identifier included in the second set of VLAN identifiers and not included in the first set of VLAN identifiers. In some embodiments, VLAN mismatch detecting mechanism 570 can identify a plurality of VLANs identified by a plurality of VLAN identifiers configured for the first device.

VLAN mismatch updating mechanism 580 generally updates VLAN configurations upon VLAN mismatch detecting mechanism 570 detects a VLAN mismatch. Specifically, responsive to receiving a second message that is responsive to the first message, VLAN mismatch updating mechanism 580 can update a first set of VLAN identifiers known to be recognized by the second device to include the particular VLAN. In some embodiments, VLAN mismatch updating mechanism 580 performs the updating operation responsive to the second message being tagged with the particular VLAN identifier.

Furthermore, responsive to not receiving any message that is responsive to the first message, VLAN mismatch updating mechanism 580 can notify VLAN mismatch detecting mechanism 570 to present a notification.

Note that, in some embodiments, the first message can be a test for determining whether the second device recognizes the particular VLAN identifier. In some embodiments, the first message can be of a particular type that is recognized by the second device as a VLAN detection message. In some embodiments, the first message is a DHCP Discover message that is generated by the first device to determine whether the second device recognizes the particular VLAN identifier.

In some embodiments, VLAN mismatch updating mechanism 580 further configures the first device to accept packets tagged with any of the plurality of VLAN identifiers.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a compute cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or n ore packets, frames or cells.

As used herein, "wireless local area network" (MILAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A first network device, comprising:
   a memory;
   a processor coupled with the memory, wherein the processor executing instructions in the memory to:
   monitor a plurality of packets received from a second network device to identify a first set of Virtual Local Area Network (VLAN) identifiers tagged in the plurality of packets, wherein the first set of VLAN identifiers are recognized by the second network device;
   receive, from a client device, a particular packet that is tagged with a particular VLAN identifier and is to be transmitted to the second network device;
   determine that a response message is not received by the first network device after a Dynamic Host Configuration Protocol (DHCP) Discover message tagged with the particular VLAN identifier is sent from the first network device to the second network device;
   determine whether the particular VLAN identifier is included in the first set of VLAN identifiers responsive to determining that the response message is not received at the first network device; and send a notification to a client device that a VLAN mismatch between the first network device and the second network device is detected responsive at least to determining that the particular VLAN identifier is not included in the first set of VLAN identifiers.

2. The first network device of claim 1, wherein the notification comprises a warning that the particular VLAN identifier may not be recognized by the second network device.

3. The first network device of claim 1, wherein the notification comprises a warning that the particular VLAN identifier may not be recognized on a port of the second network device to which messages, tagged with the particular VLAN identifier, are being forwarded by the first network device.

4. The first network device of claim 1, wherein the processor further executing the instructions to:

transmit a VLAN verification message that requests the second network device to configure the particular VLAN identifier as a recognized VLAN identifier by the second network device.

5. The first network device of claim 1, wherein the second network device includes the particular VLAN identifier in the first set of VLAN identifiers recognized by the second network device.

6. The first network device of claim 1, wherein the first network device comprises an access point.

7. The first network device of claim 1, wherein the second network device comprises at least one of a network switch and a network controller.

8. A method comprising:

monitoring, by a first network device, a plurality of packets received from a second network device to identify a first set of Virtual Local Area Network (VLAN) identifiers tagged in the plurality of packets, wherein the first set of VLAN identifiers are recognized by the second network device;

receiving, by the first network device from a client device, a particular packet that is tagged with a particular VLAN identifier and is to be transmitted to the second network device;

determining, by the first network device, that a response message is not received by the first network device after a Dynamic Host Configuration Protocol (DHCP) Discover message tagged with the particular VLAN identifier is sent from the first network device to the second network device;

determining, by the first network device, whether the particular VLAN identifier is included in the first set of VLAN identifiers responsive to determining that the response message is not received at the first network device; and sending, by the first network device, a notification to a client device that a VLAN mismatch between the first network device and the second network device is detected responsive at least to determining that the particular VLAN identifier is not included in the first set of VLAN identifiers.

9. The method of claim 8, wherein the notification comprises a warning that the particular VLAN identifier may not be recognized by the second network device.

10. The method of claim 8, wherein the notification comprises a warning that the particular VLAN identifier may not be recognized on a port of the second network device to which messages, tagged with the particular VLAN identifier, are being forwarded by the first network device.

11. The method of claim 8, further comprising:

transmitting a VLAN verification message that requests the second network device to configure the particular VLAN identifier as a recognized VLAN identifier by the second network device.

12. The method of claim 8, wherein the second network device includes the particular VLAN identifier in the first set of VLAN identifiers recognized by the second network device.

13. The method of claim 8, wherein the first network device comprises an access point.

14. The method of claim 8, wherein the second network device comprises at least one of a network switch and a network controller.

15. A non-transitory computer readable medium comprising instructions which, when executed by at least one hardware processor of a first network device, causes the at least one processor perform a plurality of operations comprising:

monitoring a plurality of packets received from a second network device to identify a first set of Virtual Local Area Network (VLAN) identifiers tagged in the plurality of packets, wherein the first set of VLAN identifiers are recognized by the second network device;

receiving, from a client device, a particular packet that is tagged with a particular VLAN identifier and is to be transmitted to the second network device;

determining that a response message is not received by the first network device after a Dynamic Host Configuration Protocol (DHCP) Discover message tagged with the particular VLAN identifier is sent from the first network device to the second network device;

determining whether the particular VLAN identifier is included in the first set of VLAN identifiers responsive to determining that the response message is not received at the first network device; and sending a notification to a client device that a VLAN mismatch between the first network device and the second network device is detected responsive at least to determining that the particular VLAN identifier is not included in the first set of VLAN identifiers.

16. The non-transitory computer readable medium of claim 15, wherein the notification comprises a warning that the particular VLAN identifier may not be recognized by the second network device.

17. The non-transitory computer readable medium of claim 15, wherein the notification comprises a warning that the particular VLAN identifier may not be recognized on a port of the second network device to which messages, tagged with the particular VLAN identifier, are being forwarded by the first network device.

18. The non-transitory computer readable medium of claim 15, wherein the plurality of operations further comprises:

transmitting a VLAN verification message that requests the second network device to configure the particular VLAN identifier as a recognized VLAN identifier by the second network device.

19. The non-transitory computer readable medium of claim 15, wherein the second network device includes the particular VLAN identifier in the first set of VLAN identifiers recognized by the second network device.

20. The non-transitory computer readable medium of claim 15, wherein the first network device comprises an access point, and wherein the second network device comprises at least one of a network switch and a network controller.

\* \* \* \* \*